(12) United States Patent
Seegel et al.

(10) Patent No.: US 11,780,120 B2
(45) Date of Patent: Oct. 10, 2023

(54) DEVICE AND METHOD

(71) Applicant: Airbus Operations GmbH, Hamburg (DE)

(72) Inventors: Hauke Seegel, Nahrendorf (DE); Anja Häberle, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 66 days.

(21) Appl. No.: 17/534,571

(22) Filed: Nov. 24, 2021

(65) Prior Publication Data

US 2022/0080624 A1    Mar. 17, 2022

Related U.S. Application Data

(63) Continuation of application No. PCT/EP2020/064596, filed on May 26, 2020.

(30) Foreign Application Priority Data

May 31, 2019    (DE) ...................... 10 2019 114 710.7

(51) Int. Cl.
*B29C 70/54* (2006.01)
*B29C 33/02* (2006.01)
(Continued)

(52) U.S. Cl.
CPC .............. *B29C 33/02* (2013.01); *B29C 33/38* (2013.01); *B29C 70/46* (2013.01); *B29C 70/548* (2013.01);
(Continued)

(58) Field of Classification Search
CPC ...... B29C 70/541; B29C 70/543; B29C 33/02
See application file for complete search history.

(56) References Cited

U.S. PATENT DOCUMENTS 1,473,842 A * 11/1923 Frederick .................. E04C 3/28
52/842
4,492,607 A * 1/1985 Halcomb .............. B29C 70/083
156/247
(Continued)

FOREIGN PATENT DOCUMENTS

DE    2600647 A1    9/1967
DE    1525815 B1    8/1971
(Continued)

OTHER PUBLICATIONS

International Search Report and Written Opinion for Application No. PCT/EP2020/064596 dated Aug. 17, 2020.
(Continued)

*Primary Examiner* — Matthew J Daniels
(74) *Attorney, Agent, or Firm* — KDW FIRM PLLC

(57) ABSTRACT

A device for manufacturing a composite component including a tool with a first and second sections forming first and second confinement surfaces, the sections movable relative to each other into and out of a fastening configuration. The device includes a closing mechanism with a closing section. In the fastening configuration, the first confinement surface and the second confinement surface face one another, and the sections and the closing mechanism are arranged such that a cavity is formed between the sections and the closing mechanism. The closing section is transferable from an open configuration into a closed configuration. In the closed configuration, the third confinement surface extends along a plane perpendicular to the first and second confinement surfaces, wherein, when the closing mechanism is heated from a first temperature to a second temperature, the closing section transfers from the open configuration into the closed configuration at a predefined temperature.

12 Claims, 8 Drawing Sheets

(51) Int. Cl.
*B29C 33/38* (2006.01)
*B29C 70/46* (2006.01)
*B29K 105/08* (2006.01)

(52) U.S. Cl.
CPC .......... *B29C 70/541* (2013.01); *B29C 70/543* (2013.01); *B29K 2105/0872* (2013.01)

(56) References Cited

U.S. PATENT DOCUMENTS

| | | | | |
|---|---|---|---|---|
| 4,633,632 | A * | 1/1987 | Sarh | B64C 1/12 52/84 |
| 4,880,583 | A | 11/1989 | Douglas | |
| 5,015,168 | A * | 5/1991 | Boime | B29D 99/0017 425/389 |
| 6,478,922 | B1 * | 11/2002 | Rosevear | B29C 70/543 264/319 |
| 7,771,557 | B2 * | 8/2010 | Sander | B64C 1/12 156/286 |
| 7,959,753 | B2 * | 6/2011 | Nunez Delgado | B29D 99/0014 156/289 |
| 8,465,613 | B2 * | 6/2013 | Rotter | B29C 70/462 264/296 |
| 9,751,239 | B2 * | 9/2017 | Murai | B29D 99/0003 |
| 10,213,970 | B2 * | 2/2019 | Heim | B29C 70/36 |
| 10,391,684 | B1 | 8/2019 | Margraf et al. | |
| 11,648,708 | B2 * | 5/2023 | Shimono | B29C 33/38 264/337 |
| 2001/0035249 | A1 * | 11/2001 | Kondo | B29C 70/46 156/65 |
| 2001/0040317 | A1 * | 11/2001 | Shiraishi | B29C 43/18 156/247 |
| 2002/0027187 | A1 * | 3/2002 | Sato | B29C 70/44 249/187.1 |
| 2010/0000667 | A1 * | 1/2010 | Funnell | B29C 33/48 156/189 |
| 2010/0044899 | A1 * | 2/2010 | Glazebrook | B29C 70/54 425/149 |
| 2010/0239865 | A1 * | 9/2010 | Kallinen | B29C 70/46 156/196 |
| 2010/0314042 | A1 * | 12/2010 | Luebbering | B29C 70/54 156/286 |
| 2010/0314807 | A1 * | 12/2010 | Lengsfeld | B29C 70/543 264/571 |
| 2011/0315307 | A1 * | 12/2011 | Perez Pastor | B29C 37/0053 156/349 |
| 2012/0118486 | A1 | 5/2012 | Everhart et al. | |
| 2013/0069281 | A1 * | 3/2013 | Hurlin | B29C 70/48 425/542 |
| 2016/0102689 | A1 * | 4/2016 | Madsen | B64C 1/641 244/173.1 |
| 2016/0158977 | A1 | 6/2016 | Ross | |
| 2019/0329856 | A1 * | 10/2019 | Shinozaki | B29C 66/5241 |

FOREIGN PATENT DOCUMENTS

| | | |
|---|---|---|
| DE | 68913348 T2 | 6/1994 |
| EP | 2687357 A1 | 1/2014 |
| WO | WO 2012/119163 A1 | 9/2012 |
| WO | WO2020/239778 A1 | 12/2020 |

OTHER PUBLICATIONS

German Search Report for Application No. 102019114710.7 dated Nov. 2, 2020.

* cited by examiner

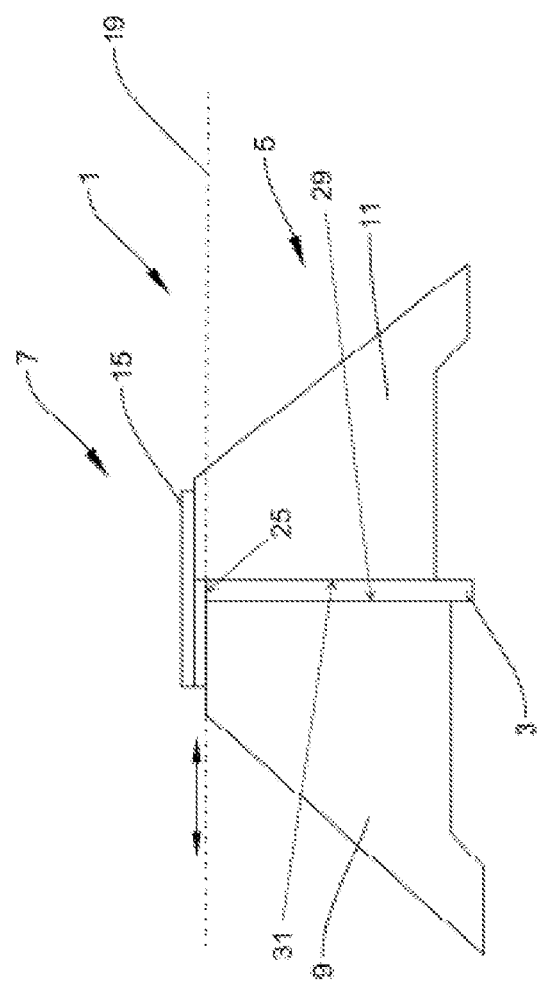

DEVICE AND METHOD

CROSS-REFERENCE TO RELATED APPLICATIONS

This application is a continuation of and claims priority to PCT/EP2020/064596 filed May 26, 2020, which claims priority to German Patent Application No. 10 2019 114 710.7 filed May 31, 2019, the entire disclosures of which are incorporated by reference herein.

TECHNICAL FIELD

The disclosure herein relates to a device for manufacturing a composite component and to a method for manufacturing a composite component using such a device.

BACKGROUND

Devices for manufacturing a composite component are known.

Such devices comprise tools onto or into which preforms comprising fiber material and matrix material can be placed for curing the preform to manufacture the composite component from the cured preform. Prior to the curing of the preform, the preform can be placed onto a surface or between multiple surfaces of a tool. Since the preform has a low stiffness prior to the curing of the preform, the flat surfaces of the preform can adapt the shape of the surface or surfaces of the tool.

During the curing of the preform the stiffness of the preform increases and the flat surfaces of the preform more or less maintain their shape from before the curing of the preform, since the tool keeps the flat surfaces of the preform in their shape during the curing of the preform. However, a portion of the matrix material can accumulate along the edges of the preform before the curing of the preform is completed such that the cured preform comprises cured matrix material along its edges, such as sprue lines. The cured matrix material along the edges of the cured preform requires additional manufacturing steps, such as trimming and sealing of the edges of the cured preform.

It is desirable that the shape of the edges of the preform after the curing of the preform are relatively closed to the desired shape of the edges of the manufactured composite component such that additional manufacturing steps, such as trimming and sealing of the edges of the cured preform, can be avoided or at least be kept at a minimum.

SUMMARY

An object of the disclosure herein is to provide a device for manufacturing a composite component with which the overall manufacturing effort can be reduced in a reliable manner.

According to a first aspect of the disclosure herein, the object is solved by a device disclosed herein. The device is configured for manufacturing a composite component. The device comprises a tool with a first section forming a first confinement surface and a second section forming a second confinement surface. The first section and the second section are movable relative to each other into and out of a fastening configuration. The device comprises a closing mechanism with a closing section forming a third confinement surface. The closing mechanism is directly or indirectly connected to the tool. When the first and second sections are arranged in the fastening configuration, the first confinement surface and the second confinement surface face one another, and the first section, the second section and the closing mechanism are arranged such that a cavity is formed between the first section, the second section and the closing mechanism. The closing section is transferable from an open configuration into a closed configuration. When the closing section is in the open configuration, the volume of the cavity is larger than the volume of the cavity when the closing section is in the closed configuration. When the closing section is in the closed configuration, the third confinement surface extends along a plane, which is arranged perpendicular to each of the first and second confinement surfaces. When the closing mechanism is heated from a first temperature to a second temperature, the closing section transfers from the open configuration into the closed configuration at a predefined temperature.

The device is configured for manufacturing the composite component. Preferably, the composite component is a stringer, such as a t-stringer. However, the disclosure herein is not restricted to stringers. Preferably, the composite component comprises fibers (fiber material), which are embedded in a matrix (matrix material), especially in a cured matrix. Hence, the composite component can be a fiber reinforced component. The fibers can be carbon fibers or glass fibers and the composite component can be a carbon fiber or glass fiber reinforced component, especially a carbon fiber or glass fiber reinforced polymer component. The matrix can be a thermosetting polymer, such as an epoxy resin. Alternatively, the matrix can be a thermoplastic polymer.

The device comprises the tool with the first section forming the first confinement surface and the second section forming the second confinement surface. The first confinement surface and the second confinement surface may each be planar, such that a preform can be placed between the first confinement surface and the second confinement surface and can be kept in a planar shape during the curing of the preform. When the first and second sections are arranged in the fastening configuration, the first confinement surface and the second confinement surface both face the cavity such that the cavity is partly confined by the first confinement surface and the second confinement surface.

The first section and the second section are movable relative to each other into and out of the fastening configuration. When the first section and the second section are not in the fastening configuration, a preform can be provided. The preform can be placed between the first section and the second section, in particular between the first confinement surface and the second confinement surface. Subsequently, the first section and the second section can be moved into the fastening configuration such that the preform is fastened between the first confinement surface and the second confinement surface. The movement of the first section and the second sections can be actuated by an actuator. Further, it is preferred that the device comprises a clamping mechanism, which acts on the first section and the second section when the first section and the second section are arranged in the fastening configuration to keep the first section and the second section in the fastening configuration against a pressure exerted from the closing section in the closed configuration against the first section and the second section.

The device comprises the closing mechanism with the closing section forming the third confinement surface. Especially, when the closing section is in the closed configuration, the third confinement surface faces the cavity such that the cavity is partly confined by the third confinement surface. The third confinement surface may be planar, such that when the closing section is in the closed configuration and a section of the preform is arranged in the cavity, the third confinement surface may provide a planar barrier. In particular, the third confinement surface may provide the planar barrier when the closing section is in the closed configuration. During curing of the preform, the matrix of the preform may flow against the planar barrier to form a planar edge of the cured preform. Further, the planar barrier may be pressed against the edge of the preform during the curing of the preform to form a planar edge of the cured preform. Especially a planar edge of the cured preform may reduce the effort after the curing of the preform to manufacture the final composite component.

The closing mechanism is directly or indirectly connected to the tool. The direct or indirect connection of the closing mechanism to the tool ensures that the closing mechanism is at least indirectly connected to the tool and the closing section is transferable from the open configuration into the closed configuration with a clearly defined arrangement of the closing section with respect to the tool.

When the first and second sections are arranged in the fastening configuration, the first confinement surface and the second confinement surface face one another such that a preform can be placed between the first confinement surface and the second confinement surface for curing the preform. Preferably, the first confinement surface and the second confinement surface are each planar, such the preform which is placed between the first confinement surface and the second confinement surface during curing the preform can comprise two planar sides of the preform after curing the preform. Preferably, the first confinement surface and the second confinement surface are arranged parallel to each other. The parallel arrangement of the first confinement surface and the second confinement surface ensure that two opposing sides of the preform are arranged parallel to each other after curing the preform.

When the first and second sections are arranged in the fastening configuration, the first section, the second section and the closing mechanism are arranged such that the cavity is formed between the first section, the second section and the closing mechanism. Preferably, each of the first confinement surface, the second confinement surface, and the third confinement surface faces the cavity such that the cavity is at least partially confined by the first confinement surface, the second confinement surface, and the third confinement surface. Further confinement surfaces may be provided, which also face the cavity and confine the cavity together with the first confinement surface, the second confinement surface, and the third confinement surface. At least a section of the preform, preferably the whole preform, may be arranged in at least a section of the cavity for curing the preform. A further section of the cavity may form a channel, preferably at least when the closing section is in the open configuration. Therefore, the cavity may form two sections, a first section of the cavity and a second section of the cavity. At least the section of the preform may be arranged in the first section of the cavity and the second section of the cavity may form the channel. It is preferred that when the closing section is in the open configuration, the whole preform is arranged in the first section of the cavity and the second section of the cavity forms the channel. Further, it is preferred that when the closing section is in the closed configuration, the cavity only comprises the first section of the cavity and that the second section of the cavity is closed, especially due to the closed configuration of the closing section. In any case, the whole preform may be arranged in the cavity, especially in the first section of the cavity, such that when the closing section is in the closed configuration, the cavity is completely filled with the preform.

The closing section is transferable from the open configuration into the closed configuration. The transferability of the closing section from the open configuration into the closed configuration ensures that the closing section can be brought from the open configuration into the closed configuration. Therefore, the closing section can change its configuration between an open configuration and a closed configuration. For example, the closing section can bring itself from the open configuration into the closed configuration due to a temperature dependent deformation of the closing section itself. Alternatively, the closing section can be brought from the open configuration into the closed configuration by a further section of the closing mechanism due to a temperature dependent actuation of the movement of the closing section by the further section of the closing mechanism. For example, the further section of the closing mechanism may be a deformable section, which actuates the movement of the closing section due to a temperature dependent deformation of the deformable section. Preferably, the closing section is also transferable from the closed configuration into the open configuration. If the closing section is also transferable from the closed configuration into the open configuration, the closing section can be reused for curing multiple preforms one after the other.

When the closing section is in the open configuration, the volume of the cavity is larger than the volume of the cavity when the closing section is in the closed configuration. Therefore, the volume of the cavity depends on the configuration of the closing section. A reduction of the volume due to a change of the configuration of the closing section from the open configuration to the closed configuration ensures that when the closing section is in the closed configuration less volume is provided for the preform compared to the situation in which the closing section is in the open configuration. Preferably, the preform is cured when the closing section is in the closed configuration and due to the volume reduction of the cavity when the closing section is in the closed configuration compared to the situation when the closing section is in the open configuration, less volume is provided for the matrix material of the preform to flow into at elevated temperatures. In particular, less volume along the edge or the edges of the preform is provided for the matrix material of the preform to flow into at elevated temperatures.

When the closing section is in the closed configuration, the third confinement surface extends along a plane, which is arranged perpendicular to each of the first and second confinement surfaces. Due to the extension of the third confinement surface along the plane, which is arranged perpendicular to each of the first and second confinement surfaces, the edge of the cured preform may be arranged perpendicular to two opposing sides of the preform. The perpendicular arrangement of the edge of the cured preform to the two opposing sides of the preform may reduce the effort after the curing of the preform to manufacture the final composite component.

When the closing mechanism is heated from the first temperature to the second temperature, the closing section transfers from the open configuration into the closed configuration at the predefined temperature. Therefore, the configuration of the closing section changes from the open configuration into the closed configuration depending on the temperature of the closing mechanism. Hence, the configuration of the closing section changes from the open configuration into the closed configuration in a reliable manner. Preferably, the second temperature is higher than the first temperature. For example, the first temperature is 110° C. and the second temperature is 120° C. Preferably, the predefined temperature is higher than the first temperature and lower than the second temperature. Further, it is preferred that the predefined temperature is below the gel temperature of the matrix material of the preform. It is even more preferred that the predefined temperature is below the curing temperature at which the preform is cured. In particular, it is preferred that the closing section starts to transfer from the open configuration into the closed configuration at the predefined temperature such that the closing section is transferred to the closed configuration when the closing mechanism reaches the second temperature. The transfer of the closing section from the open configuration into the closed configuration at the predefined temperature ensures that the transfer takes place at a temperature which is sufficiently low such that the transfer takes place before the curing of the preform is completed and the matrix material's viscosity is low enough such that the preform is still plastically deformable. The completion of the transfer from the open configuration into the closed configuration before the curing of the preform is completed ensures that the preform, especially the matrix material of the preform, can be formed into a desired shape, in particular by the third confinement surface acting on the edge of the preform in the closed configuration of the closing section, before the curing of the preform is completed.

In summary, a device for manufacturing a composite component is provided with which the overall manufacturing effort can be reduced in a reliable manner.

According to a preferred embodiment of the device, the closing section is deformable, wherein, when the closing mechanism is heated from the first temperature to the second temperature, the closing section deforms such that the closing section transfers from the open configuration into the closed configuration at the predefined temperature. The temperature dependent deformation of the closing section at the predefined temperature ensures that the closing section transfers from the open configuration into the closed configuration when the closing mechanism is heated from the first temperature to the second temperature. The transfer of the closing section from the open configuration into the closed configuration may be caused by the temperature dependent deformation of the closing section and, therefore, no further components are needed to bring the closing section from the open configuration into the closed configuration.

According to a preferred embodiment of the device, the closing section comprises a shape memory polymer. The shape memory polymer may deform from a deformed configuration into an undeformed configuration when the closing mechanism is heated from the first temperature to the second temperature such that the closing section transfers from the open configuration into the closed configuration at the predefined temperature.

According to a preferred embodiment of the device, the closing section comprises a shape memory alloy. The shape memory alloy may deform from a deformed configuration into an undeformed configuration when the closing mechanism is heated from the first temperature to the second temperature such that the closing section transfers from the open configuration into the closed configuration at the predefined temperature.

According to a preferred embodiment of the device, the closing section comprises a bimetal. The bimetal may be formed of a first metallic strip and a second metallic strip. The first metallic strip may be formed of a first metal and the second metallic strip may be formed of a second metal. The first metal can have a coefficient of thermal expansion, which is higher than the coefficient of thermal expansion of the second metal. Preferably, the first metal is copper or brass. In addition, it is preferred that the second metal is steel. The bimetal may deform from a deformed configuration into an undeformed configuration when the closing mechanism is heated from the first temperature to the second temperature such that the closing section transfers from the open configuration into the closed configuration at the predefined temperature.

According to a preferred embodiment of the device, the closing section is movable relative to the tool, wherein, when the closing mechanism is heated from the first temperature to the second temperature, the closing section moves relative to the tool such that the closing section transfers from the open configuration into the closed configuration at the predefined temperature. In case the closing section moves relative to the tool such that the closing section transfers from the open configuration into the closed configuration at the predefined temperature when the closing mechanism is heated from the first temperature to the second temperature, the closing section does not need to be deformed for the transfer of the closing section from the open configuration into the closed configuration. Further, the closing section, especially the third confinement surface, can form a negative form for the edge of the preform, wherein the negative form is not deformed when the closing section transfers from the open configuration into the closed configuration. The negative form can have a predefined shape such that the edge of the cured preform has a desired shape.

According to a preferred embodiment of the device, the closing section comprises a magnetic material. Due to the magnetic material of the closing section, the closing section can be brought from the open configuration into the closed configuration by the further section of the closing mechanism due to a temperature dependent actuation of the movement of the closing section by the further section of the closing mechanism. For the temperature dependent actuation of the movement of the closing section, the further section of the closing mechanism may also comprise a magnetic material such that the magnetic material of the further section can act magnetically on the magnetic material of the closing section such that the closing section transfers from the open configuration into the closed configuration.

It is preferred that the closing mechanism comprises a preloading element, such as a spring, and a holding element. Preferably, the closing section is preloaded, especially spring-loaded, by the preloading element in the open configuration such that the closing section can be brought from the open configuration into the closed configuration by the preloading element. The holding element can be brought from an activated configuration into a deactivated configuration. Preferably, the holding element transfers from the activated configuration into the deactivated configuration when the closing mechanism is heated from the first temperature to the second temperature. The closing section can be held in the open configuration by the holding element against the action of the preloading element on the closing section when the holding element is in the activated configuration. The preloading element acts on the closing section such that when the holding element is in the deactivated configuration, the preloading of the closing section by the preloading element brings the closing section from the open configuration into the closed configuration.

According to a preferred embodiment of the device, when the closing section is in the open configuration, a section of the cavity forms a channel, which is partially confined by the third confinement surface and extends parallel to the plane on the side of the plane facing the closing section. The channel can be used to infuse the fiber material of the preform with matrix material of the preform before the preform is cured. Preferably, a matrix source, especially a resin source, is provided. The channel can be connected to the matrix source such that the channel can be used to transfer matric material from the matrix source via the channel and into the fiber material. It is particularly preferred to apply release agent to the inner walls of the channel before matrix material is transferred through the channel such that the device can be used for manufacturing several composite components one after the other.

According to a preferred embodiment of the device, the third confinement surface is formed by a mechanically reinforced section of the closing section. The mechanically reinforced section of the closing section, which forms the third confinement surface, ensures that the third confinement surface can act on the preform, especially on an edge of the preform, with a high pressure in an even manner without the mechanically reinforced section deforming. Hence, the mechanically reinforced section of the closing section can act during curing of the preform as a caul plate on top of the preform, especially on the edge of the preform. Therefore, the mechanically reinforced section ensures that a preform with a high viscosity matrix can be deformed by the third confinement surface prior to curing the preform to give the edge of the cured preform a desired shape.

According to a second aspect of the disclosure herein, the object is also solved by a method disclosed herein. The method is suitable for manufacturing a composite component using a device according to the first aspect of the disclosure herein. The method comprises providing a preform. Further, the method comprises moving the first section and the second section relative to each other into the fastening configuration such that the first confinement surface and the second confinement surface face one another and at least a section of the preform is arranged in the cavity formed between the first section, the second section and the closing mechanism. In addition, the method comprises heating the closing mechanism from the first temperature to the second temperature such that the closing section transfers from the open configuration into the closed configuration at the predefined temperature such that the third confinement surface of the closing section extends along the plane, which is arranged perpendicular to each of the first and second confinement surfaces.

According to a preferred embodiment of the method, the preform comprises pre-preg material. In case the preform comprises pre-preg material, a method can be provided, which ensures clean processing. Further, a method can be provided with a defined fiber to matrix volume fraction.

According to a preferred embodiment of the method, the preform comprises fiber material for resin infusion. In case the preform comprises fiber material for resin infusion, resin can be infused into the fiber material before curing the preform. Further, a method can be provided to manufacture a composite component for individual applications, since complex structures of the composite component can be achieved with resin infusion.

The features, technical effects and/or advantages described in connection with the first aspect of the disclosure herein also apply to the second aspect of the disclosure herein at least in an analogous manner, so that no corresponding repetition is made here. Even though the method steps are described in a certain order, the disclosure herein is not restricted to this order. Rather, the individual method steps can be carried out in any meaningful sequence.

BRIEF DESCRIPTION OF THE DRAWINGS

Further features, advantages and application possibilities of the disclosure herein may be derived from the following description of example embodiments and/or the figures. Thereby, all described and/or visually depicted features for themselves and/or in any combination may form an advantageous subject matter and/or features of the disclosure herein independent of their combination in the individual claims or their dependencies. Furthermore, in the figures, same reference signs may indicate same or similar objects.

FIG. 8 schematically illustrates an eighth embodiment of the device for manufacturing a composite component, wherein a closing section of a closing mechanism of the device is shown in a closed configuration.

DETAILED DESCRIPTION

Figure 1:
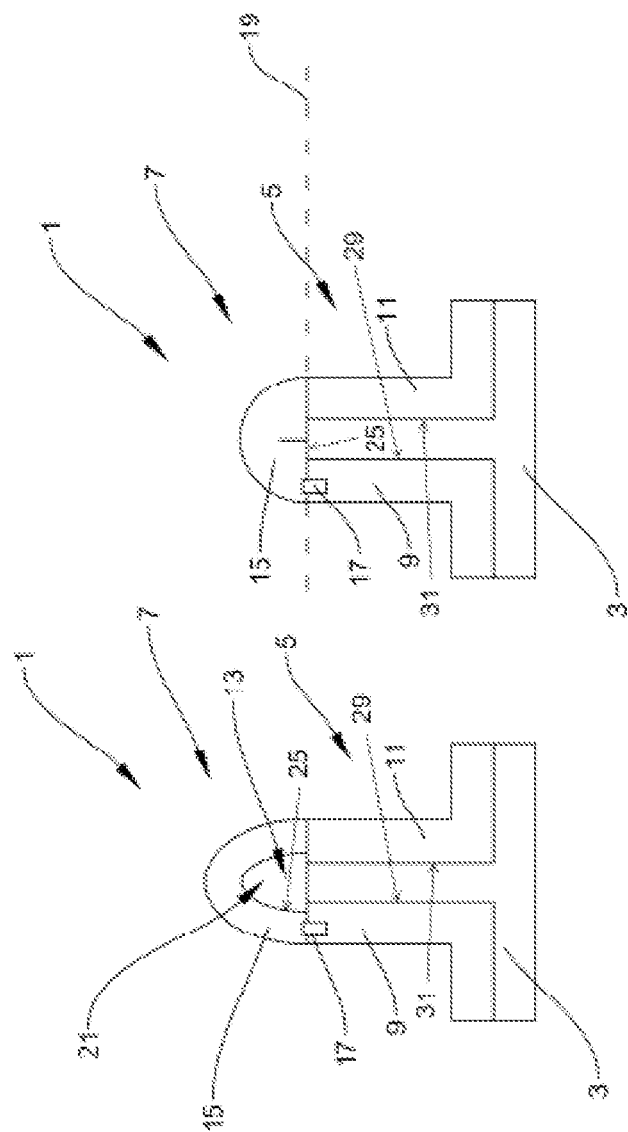
FIGS. 1A and 1B schematically illustrate a first embodiment of a device for manufacturing a composite component, wherein a closing section of a closing mechanism of the device is shown in an open configuration in FIG. 1A and in a closed configuration in FIG. 1B.

FIGS. 1A and 1B schematically illustrate a first embodiment of a device 1 for manufacturing a composite component. A preform 3, which may comprise pre-preg material or dry fiber material that is due to be infused or resin infused fiber material, is shown in FIG. 1A and FIG. 1B before a suitable temperature treatment to cure the matrix material of the preform 3 to form the composite component. The device 1 comprises a tool 5 and a closing mechanism 7, wherein the closing mechanism 7 is directly connected to the tool 5.

The tool 5 comprises a first section 9 and a second section 11. The first section 9 and the second section 11 are movable relative to each other into and out of a fastening configuration. The fastening configuration is shown in FIG. 1A and FIG. 1B. The first section 9 forms a first confinement surface 29 and the second section 11 forms a second confinement surface 31. When the first section 9 and the second section 11 are arranged in the fastening configuration as shown in FIG. 1A and FIG. 1B, the first confinement surface 29 and the second confinement surface 31 face one another.

Further, when the first section 9 and the second section 11 are arranged in the fastening configuration, the first section 9, the second section 11 and the closing mechanism 7 are arranged such that a cavity 13 is formed between the first section 9, the second section 11 and the closing mechanism 7. In FIG. 1A and FIG. 1B a section of the preform 3 is arranged in the cavity 13.

In addition, the closing mechanism 7 comprises a closing section 15 forming a third confinement surface 25. The closing section 15 is connected via a connector 17 to the first section 9. The closing section 15 is transferable from an open configuration shown in FIG. 1A into a closed configuration shown in FIG. 1B. When the closing section 15 is in the open configuration, the volume of the cavity 13 is larger than the volume of the cavity 13 when the closing section 15 is in the closed configuration. When the closing section 15 is in the closed configuration, the third confinement surface 25 extends along a plane 19. The plane 19 is arranged perpendicular to each of the first and second confinement surfaces 29, 31.

The closing mechanism 7 can be heated from the first temperature to the second temperature. When the closing mechanism 7 is heated from the first temperature to the second temperature, the closing section 15 transfers from the open configuration into the closed configuration at a predefined temperature. In particular, the closing section 15 of the embodiment shown in FIGS. 1A and 1B is deformable. When the closing mechanism 7 is heated from the first temperature to the second temperature, the closing section 15 deforms such that the closing section 15 transfers from the open configuration into the closed configuration at the predefined temperature. The deformation of the closing section 15 such that the closing section 15 transfers from the open configuration into the closed configuration is made possible by the embodiment shown in FIGS. 1A and 1B, since the closing section 15 comprises a shape memory polymer. However, the closing section 15 may also comprise a shape memory alloy or a bimetal such that, when the closing mechanism 7 is heated from the first temperature to the second temperature, the closing section 15 deforms such that the closing section 15 transfers from the open configuration into the closed configuration at the predefined temperature.

When the closing section 15 is in the open configuration, a section of the cavity 13 forms a channel 21 between the preform 3, the first section 9, the second section 11, and the closing section 15. The channel 21 extends parallel to the plane 19 on the side of the plane 19 facing the closing section 15. In case the preform 3 comprises fiber material for resin infusion, the channel 21 can be used to transfer resin from a resin source via the channel 21 and into the fiber material.

Figure 2:
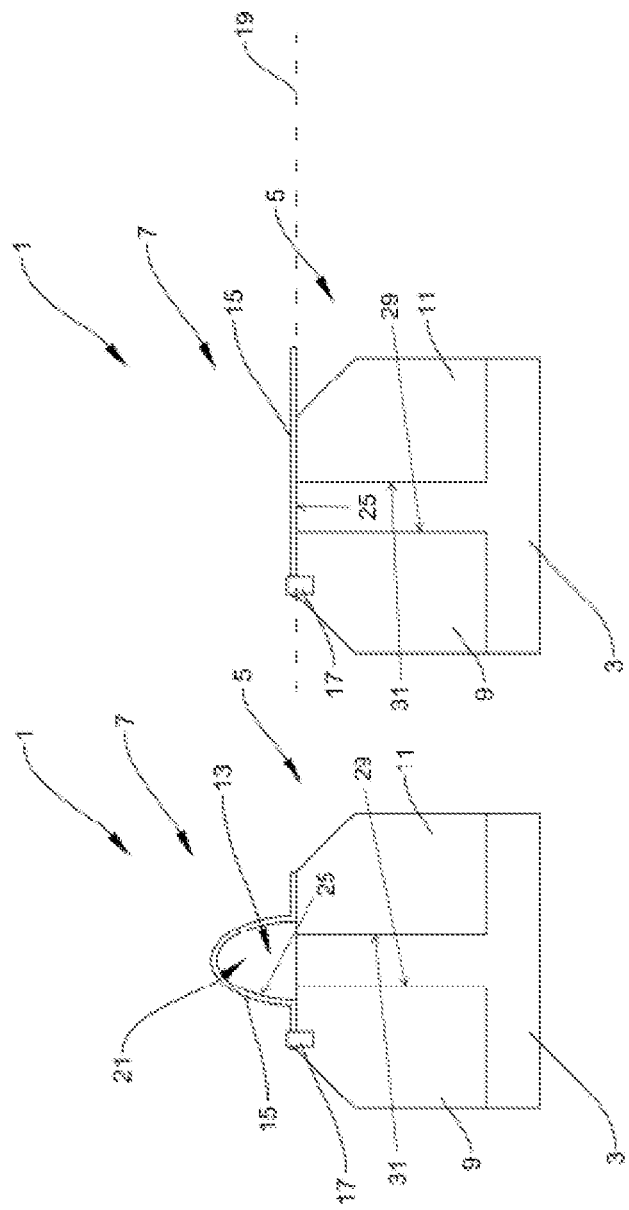
FIGS. 2A and 2B schematically illustrate a second embodiment of the device for manufacturing a composite component, wherein a closing section of a closing mechanism of the device is shown in an open configuration in FIG. 2A and in a closed configuration in FIG. 2B.

FIGS. 2A and 2B schematically illustrate a second embodiment of the device 1 for manufacturing a composite component. The features, technical effects and/or advantages described in connection with the first embodiment of the device 1 and the preform 3 shown in FIGS. 1A and 1B also apply to the second embodiment of the device 1 shown in FIGS. 2A and 2B at least in an analogous manner, so that no corresponding repetition is made here.

Figure 3:
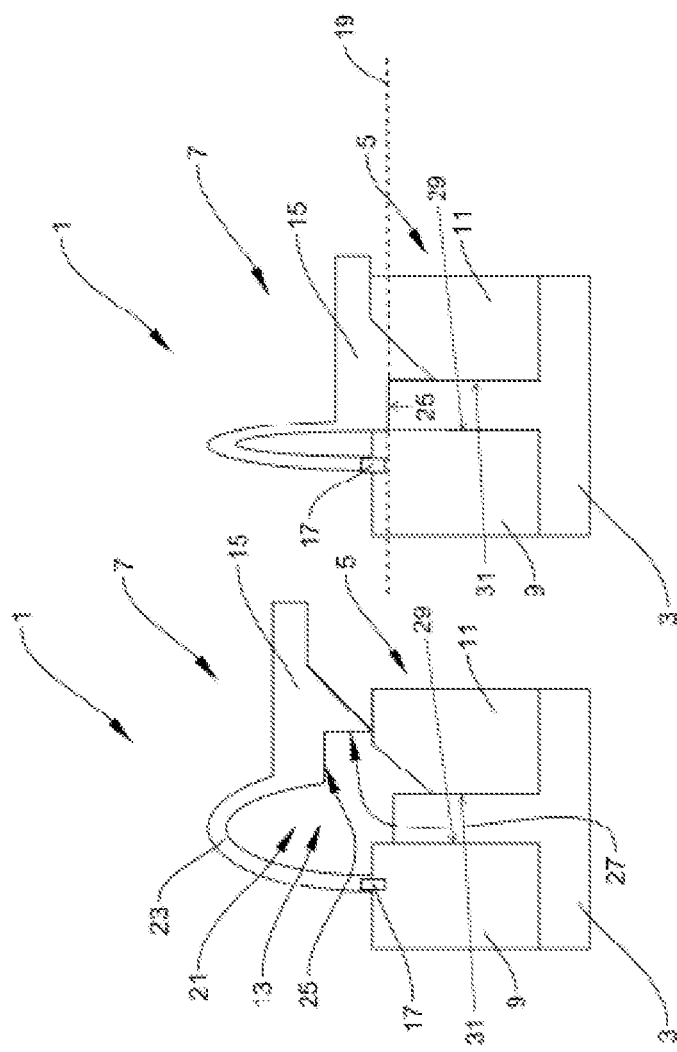
FIGS. 3A and 3B schematically illustrate a third embodiment of the device for manufacturing a composite component, wherein a closing section of a closing mechanism of the device is shown in an open configuration in FIG. 3A and in a closed configuration in FIG. 3B.

FIGS. 3A and 3B schematically illustrate a third embodiment of the device 1 for manufacturing a composite component. A preform 3, which may comprise pre-preg material or resin infused fiber material, is shown in FIG. 3A and FIG. 3B before the preform 3 is heat treated to cure the matrix material of the preform 3 to form the composite component. The device 1 comprises the tool 5 and the closing mechanism 7, wherein the closing mechanism 7 is directly connected to the tool 5.

Similar to the embodiments shown in FIGS. 1A and 1B and FIGS. 2A and 2B, the tool 5 comprises the first section 9 and the second section 11. The first section 9 and the second section 11 are movable relative to each other into and out of a fastening configuration. The fastening configuration is shown in FIG. 3A and FIG. 3B. The first section 9 forms a first confinement surface 29 and the second section 11 forms a second confinement surface 31. When the first section 9 and the second section 11 are arranged in the fastening configuration as shown in FIG. 3A and FIG. 3B, the first confinement surface 29 and the second confinement surface 31 face one another.

Further, when the first section 9 and the second section 11 are arranged in the fastening configuration, the first section 9, the second section 11 and the closing mechanism 7 are arranged such that a cavity 13 is formed between the first section 9, the second section 11 and the closing mechanism 7. In FIG. 3A and FIG. 3B a section of the preform 3 is arranged in the cavity 13.

In addition, the closing mechanism 7 comprises a closing section 15 and a deformable section 23. The closing section 15 forms a third confinement surface 25 and a fourth confinement surface 27. The third confinement surface extends transversely, especially perpendicular, to the fourth confinement surface 27. The deformable section 23 is connected via the connector 17 to the first section 9. The closing section 15 is transferable from the open configuration shown in FIG. 3A into the closed configuration shown in FIG. 3B. When the closing section 15 is in the open configuration, the volume of the cavity 13 is larger than the volume of the cavity 13 when the closing section 15 is in the closed configuration. When the closing section 15 is in the closed configuration, the third confinement surface 25 extends along the plane 19. The plane 19 is arranged perpendicular to each of the first and second confinement surfaces 29, 31.

The closing mechanism 7 can be heated from the first temperature to the second temperature. When the closing mechanism 7 is heated from the first temperature to the second temperature, the closing section 15 transfers from the open configuration into the closed configuration at the predefined temperature. In particular, the deformable section 23 of the embodiment shown in FIG. 3A and FIG. 3B is deformable. When the closing mechanism 7 is heated from the first temperature to the second temperature, the deformable section 23 deforms such that the closing section 15 transfers from the open configuration into the closed configuration at the predefined temperature. The deformation of the deformable section 23 such that the closing section 15 transfers from the open configuration into the closed configuration is made possible by the embodiment shown in FIGS. 3A and 3B, since the deformable section 23 comprises a shape memory polymer. However, the deformable section 23 may also comprise a shape memory alloy or a bimetal such that, when the closing mechanism 7 is heated from the first temperature to the second temperature, the deformable section 23 deforms such that the closing section 15 transfers from the open configuration into the closed configuration at the predefined temperature.

In the embodiment shown in FIGS. 3A and 3B, the closing section 15 is movable relative to the tool 5, wherein, when the closing mechanism 7 is heated from the first temperature to the second temperature, the closing section moves relative to the tool 5 such that the closing section 15 transfers from the open configuration into the closed configuration at the predefined temperature. In this embodiment, the temperature dependent deformation of the deformable section 23 actuates the movement of the closing section 15 relative to the tool 5. However, other actuators than the deformable section 23 can be provided to actuate the movement of the closing section 15 relative to the tool 5 such that the closing section 15 transfers from the open configuration into the closed configuration at the predefined temperature. For example, the closing section 15 may comprise a magnetic material. Due to the magnetic material of the closing section 15, the closing section 15 can be brought from the open configuration into the closed configuration by a further section, which may be the deformable section 23, of the closing mechanism 7 due to a temperature dependent actuation of the movement of the closing section 15 by the further section of the closing mechanism 7. For the temperature dependent actuation of the movement of the closing section 15, the further section of the closing mechanism 7 may also comprise a magnetic material such that the magnetic material of the further section can act magnetically on the magnetic material of the closing section 15 such that the closing section 15 transfers from the open configuration into the closed configuration.

When the closing section 15 is in the open configuration, a section of the cavity 13 forms a channel 21 between the preform 3, the first section 9, the second section 11, and the closing mechanism 7. The channel 21 extends parallel to the plane 19 at least partially on the side of the plane 19 facing the closing section 15. In case the preform 3 comprises fiber material for resin infusion, the channel 21 can be used to transfer resin from a resin source via the channel 21 and into the fiber material.

Figure 4:
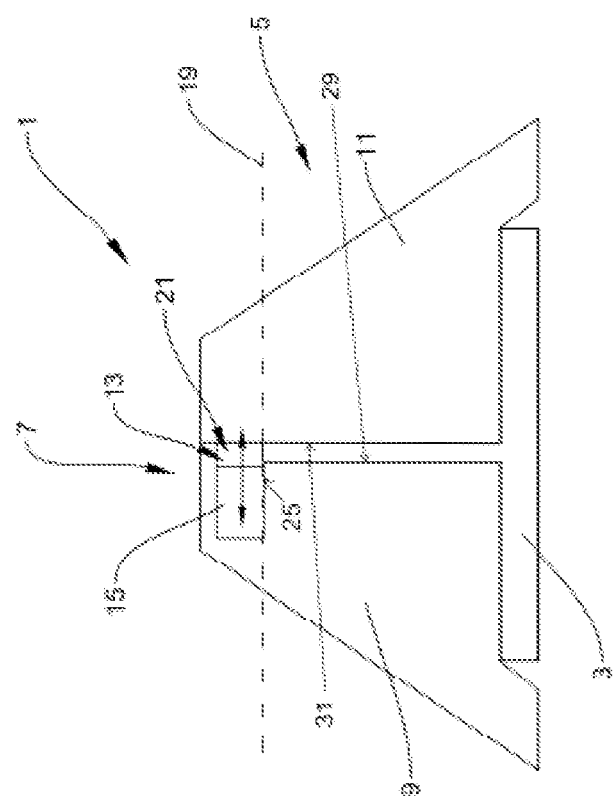
FIG. 4 schematically illustrates a fourth embodiment of the device for manufacturing a composite component, wherein a closing section of a closing mechanism of the device is shown in an open configuration.

FIG. 4 schematically illustrates a fourth embodiment of the device 1 for manufacturing a composite component. The preform 3, which may comprise pre-preg material or resin infused fiber material, is shown in FIG. 4 before the preform 3 is heat treated to cure the matrix material of the preform 3 to form the composite component. The device 1 comprises the tool 5 and the closing mechanism 7, wherein the closing mechanism 7 is directly connected to the tool 5.

Similar to the previous embodiments, the tool 5 comprises the first section 9 and the second section 11. The first section 9 and the second section 11 are movable relative to each other into and out of a fastening configuration. The fastening configuration is shown in FIG. 4. The first section 9 forms a first confinement surface 29 and the second section 11 forms a second confinement surface 31. When the first section 9 and the second section 11 are arranged in the fastening configuration, the first confinement surface 29 and the second confinement surface 31 face one another.

Further, when the first section 9 and the second section 11 are arranged in the fastening configuration, the first section 9, the second section 11 and the closing mechanism 7 are arranged such that a cavity 13 is formed between the first section 9, the second section 11 and the closing mechanism 7. In FIG. 4 a section of the preform 3 is arranged in the cavity 13.

In addition, the closing mechanism 7 comprises a closing section 15. The closing section 15 is connected to the first section 9. The closing section 15 is transferable from an open configuration shown in FIG. 4 into a closed configuration by expanding in the direction of the double arrow shown in FIG. 4. When the closing section 15 is in the open configuration, the volume of the cavity 13 is larger than the volume of the cavity 13 when the closing section 15 is in the closed configuration. In this embodiment of the device 1, the third confinement surface 25 of the closing section 15 extends along the plane 19 in the open configuration as well as in the closed configuration. The plane 19 is arranged perpendicular to each of the first and second confinement surfaces 29, 31.

The closing mechanism 7 can be heated from the first temperature to the second temperature. When the closing mechanism 7 is heated from the first temperature to the second temperature, the closing section 15 transfers from the open configuration into the closed configuration at a predefined temperature by expanding in the direction of the double arrow shown in FIG. 4.

In particular, the closing section 15 of the embodiment shown in FIG. 4 is deformable. When the closing mechanism 7 is heated from the first temperature to the second temperature, the closing section 15 deforms such that the closing section 15 transfers from the open configuration into the closed configuration at the predefined temperature. The deformation of the closing section 15 such that the closing section 15 transfers from the open configuration into the closed configuration is made possible by the embodiment of the device 1 shown in FIG. 4, since the closing section 15 comprises a material, especially a rubber material, which expands due to a temperature increase such that the closing section 15 transfers from the open configuration into the closed configuration at the predefined temperature. Further, the closing section 15 may comprise a shape memory polymer, a shape memory alloy or a bimetal such that, when the closing mechanism 7 is heated from the first temperature to the second temperature, the closing section 15 deforms such that the closing section 15 transfers from the open configuration shown in FIG. 4 into the closed configuration at the predefined temperature.

When the closing section 15 is in the open configuration as shown in FIG. 4, a section of the cavity 13 forms a channel 21 between the preform 3, the first section 9, the second section 11, and the closing section 15. The channel 21 extends parallel to the plane 19 on the side of the plane 19 facing the closing section 15. In case the preform 3 comprises fiber material for resin infusion, the channel 21 can be used to transfer resin from a resin source via the channel 21 and into the fiber material.

Figure 5:
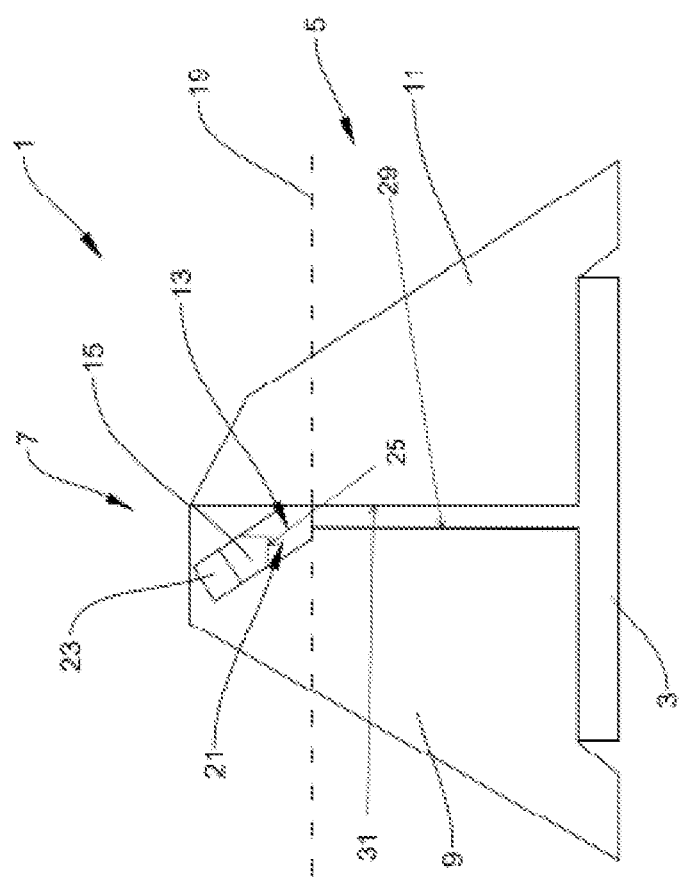
FIG. 5 schematically illustrates a fifth embodiment of the device for manufacturing a composite component, wherein a closing section of a closing mechanism of the device is shown in an open configuration.

FIG. 5 schematically illustrates a fifth embodiment of the device 1 for manufacturing a composite component. Most of the features, technical effects and/or advantages described in connection with the fourth embodiment of the device 1 and the preform 3 shown in FIG. 4 also apply to the fifth embodiment of the device 1 shown in FIG. 5 at least in an analogous manner, so that no corresponding repetition is made here.

In addition, the closing mechanism 7 in FIG. 5 comprises the closing section 15 and the deformable section 23. The deformable section 23 may be connected to the first section 9 and may extend from first section 9 to the closing section 15. When the closing mechanism 7 is heated from the first temperature to the second temperature, the deformable section 23 deforms such that the closing section 15 transfers from the open configuration shown in FIG. 5 into the closed configuration at the predefined temperature. Therefore, the closing section 15 is movable relative to the tool 5. When the closing mechanism 7 is heated from the first temperature to the second temperature, the closing section 15 moves relative to the tool 5 such that the closing section transfers from the open configuration into the closed configuration at the predefined temperature. The temperature dependent deformation of the deformable section 23 actuates the movement of the closing section 15 relative to the tool 5. However, as discussed with regard to previous embodiments of the device 1, other actuators than the deformable section 23 can be provided to actuate the movement of the closing section 15 relative to the tool 5 such that the closing section 15 transfers from the open configuration into the closed configuration at the predefined temperature. To provide the deformation of the deformable section 23 such that the closing section 15 transfers from the open configuration into the closed configuration, the deformable section 23 may comprise a shape memory polymer. The deformable section 23 may also comprise a shape memory alloy or a bimetal such that, when the closing mechanism 7 is heated from the first temperature to the second temperature, the deformable section 23 deforms such that the closing section 15 transfers from the open configuration into the closed configuration at the predefined temperature.

When the closing section 15 is in the open configuration, a section of the cavity 13 forms a channel 21 between the preform 3, the first section 9, the second section 11, and the closing section 15. The channel 21 extends parallel to the plane 19 on the side of the plane 19 facing the closing section 15. In case the preform 3 comprises fiber material for resin infusion, the channel 21 can be used to transfer resin from a resin source via the channel 21 and into the fiber material.

Figure 6A:
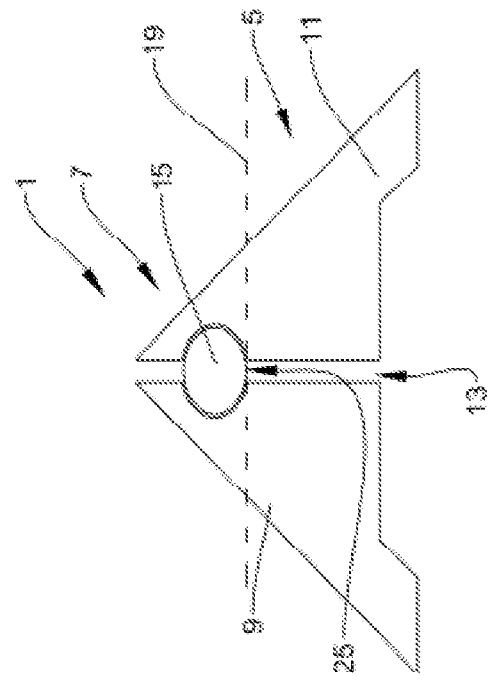
FIGS. 6A and 6B schematically illustrate a sixth embodiment of the device for manufacturing a composite component, wherein a closing section of a closing mechanism of the device is shown in an open configuration in FIG. 6A and in a closed configuration in FIG. 6B.
Figure 6B:
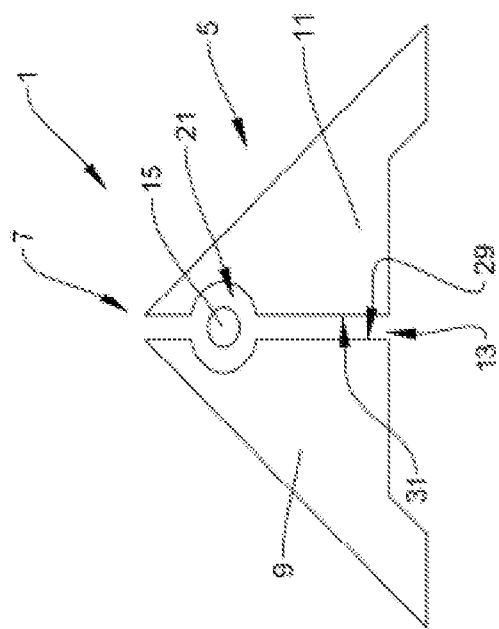

FIGS. 6A and 6B schematically illustrate a sixth embodiment of the device 1 for manufacturing a composite component. The device 1 comprises the tool 5 and the closing mechanism 7, wherein the closing mechanism 7 is indirectly connected to the tool 5 via a connector not shown in FIGS. 6A and 6B. The tool 5 comprises a first section 9 and a second section 11. The first section 9 and the second section 11 are movable relative to each other into and out of the fastening configuration. The fastening configuration is shown in FIG. 6A and FIG. 6B. The first section 9 forms the first confinement surface 29 and the second section 11 forms the second confinement surface 31. When the first section 9 and the second section 11 are arranged in the fastening configuration, the first confinement surface 29 and the second confinement surface 31 face one another.

When the first section 9 and the second section 11 are arranged in the fastening configuration, the first section 9, the second section 11 and the closing section 15 of the closing mechanism 7 are arranged such that a cavity 13 is formed between the first section 9, the second section 11 and the closing section 15. A section of a preform 3 may be arranged in the cavity 13, such that the preform 3 extends to the plane 19 on the side of the plane 19 facing away from the closing section 15.

The closing section 15 of the closing mechanism 7 forms a third confinement surface 25. The third confinement surface 25 may be formed by a mechanically reinforced section of the closing section 15. The closing section is transferable from an open configuration shown in FIG. 6A into a closed configuration shown in FIG. 6B. When the closing section 15 is in the open configuration, the volume of the cavity 13 is larger than the volume of the cavity 13 when the closing section 15 is in the closed configuration. When the closing section 15 is in the closed configuration, the third confinement surface 25 extends along the plane 19. The plane 19 is arranged perpendicular to each of the first and second confinement surfaces 29, 31.

When the closing mechanism 7 is heated from the first temperature to the second temperature, the closing section 15 transfers from the open configuration into the closed configuration at a predefined temperature. In particular, the closing section 15 of the embodiment shown in FIGS. 6A and 6B is deformable. When the closing mechanism 7 is heated from the first temperature to the second temperature, the closing section 15 deforms such that the closing section 15 transfers from the open configuration into the closed configuration at the predefined temperature. The deformation of the closing section 15 such that the closing section 15 transfers from the open configuration into the closed configuration is made possible by the embodiment shown in FIGS. 6A and 6B, since the closing section 15 comprises a material, especially a rubber material, which expands due to a temperature increase such that the closing section 15 transfers from the open configuration into the closed configuration at the predefined temperature. Further, the closing section may be formed of a pressurized tube such that, when the closing mechanism 7 is heated from the first temperature to the second temperature, the closing section 15 deforms, especially expands in the plane of FIGS. 6A and 6B, such that the closing section 15 transfers from the open configuration into the closed configuration at the predefined temperature.

It is preferred that the device 1 comprises a clamping mechanism, which acts on the first section 9 and the second section 11 when the first section 9 and the second section 11 are arranged in the fastening configuration to keep the first section 9 and the second section 11 in the fastening configuration against a pressure exerted from the closing section 15 in the closed configuration against the first section 9 and the second section 11.

When the closing section 15 is in the open configuration as shown in FIG. 6A, a section of the cavity 13 forms a channel 21 between the first section 9, the second section 11, and the closing section 15. The channel 21 extends parallel to the plane 19 on the side of the plane 19 facing the closing section 15. The channel 21 can be used to transfer resin from a resin source via the channel 21 and into fiber material of a preform.

Figure 7:
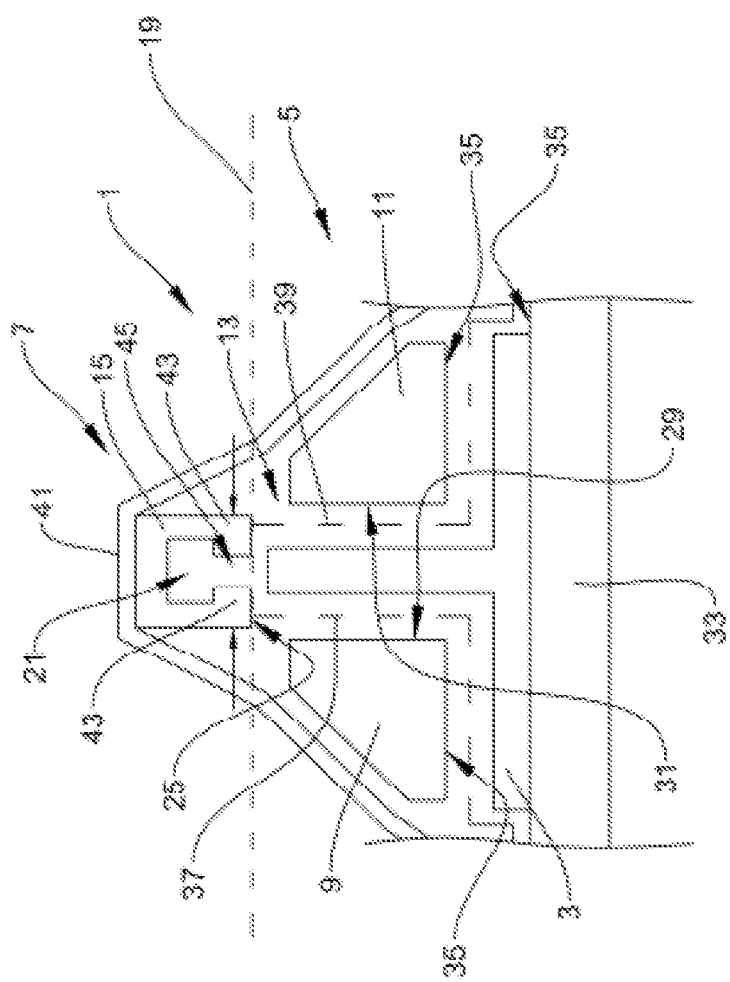
FIG. 7 schematically illustrates a seventh embodiment of the device for manufacturing a composite component, wherein a closing section of a closing mechanism of the device is shown in an open configuration.

FIG. 7 schematically illustrates a seventh embodiment of the device 1 for manufacturing a composite component. A preform 3, which may comprise pre-preg material or resin infused fiber material, is shown in FIG. 7 before a suitable temperature treatment to cure the matrix material of the preform 3 to form the composite component. The device 1 comprises the tool 5 and the closing mechanism 7, wherein the closing mechanism 7 is indirectly connected to the tool 5.

The tool 5 comprises a first section 9, a second section 11, and a third section 33. The first section 9, the second section 11, and the third section 33 are movable relative to each other into and out of a fastening configuration. The first section 9 forms a first confinement surface 29 and the second section 11 forms a second confinement surface 31. When the first section 9 and the second section 11 are arranged in the fastening configuration, the first confinement surface 29 and the second confinement surface 31 face one another. In addition, the first section 9, the second section 11, and the third section 33 each form a further confinement surface 35. The further confinement surface 35 of the first section 9 and the further confinement surface 35 of the third section 33 face one another. In addition, the further confinement surface of the second section 11 and the further confinement surface 35 of the third section 33 face one another. In principle, FIG. 7 shows the fastening configuration. However, due to presentation reasons, the first section 9 and the second section 11 are each shown to be slightly spaced apart from the preform 3. A first cover ply 37 is arranged between the preform 3 and the first section 9. A second cover ply 39 is arranged between the preform 3 and the second section 11. The first cover ply 37 and the second cover ply 39 each provide a barrier to avoid a direct contact between the preform 3 and the first section 9 as well as between the preform 3 and the second section 11. Each of the barriers can help to avoid fibers of the preform 3 being clamped in an uncontrolled manner when the first section 9 and the second section 11 are brought into the fastening configuration. Further, each of the barriers can provide a guide for the resin while the preform 3 is heated for curing of the resin to achieve a near net shape of the composite component, especially of the surface of the composite component.

When the first section 9, the second section 11, and the third section 33 are arranged in the fastening configuration, the first section 9, the second section 11, the third section 33, and the closing mechanism 7 are arranged such that a cavity 13 is formed between the first section 9, the second section 11, the third section 33, and the closing mechanism 7. In FIG. 7 the preform 3 is arranged in the cavity 13.

Moreover, FIG. 7 shows a bag 41. The bag 41 can be connected to the third section 33 of the tool 5 to form a fluid-tight connection between the bag 41 and the third section 33. The fluid-tight connection can ensure that due to an under pressure or vacuum in the cavity 13 and the atmospheric pressure in the surrounding of the bag 41, resin can be infused through the channel 21 into the cavity 13. For this purpose, the bag 41 and the third section 33 together enclose the preform 3, the tool 5, the closing mechanism 7, the first cover ply 37, and the second cover ply 39.

The closing mechanism 7 comprises the closing section 15 forming the third confinement surface 25. The closing section 15 is connected via the bag 41 to the tool 5. In addition, a connector can be provided, which connects the closing section 15 to the tool 5. The closing section 15 is transferable from an open configuration shown in FIG. 7 into a closed configuration. When the closing section 15 is in the open configuration, the volume of the cavity 13 is larger than the volume of the cavity 13 when the closing section 15 is in the closed configuration. When the closing section 15 is in the closed configuration, the third confinement surface 25 extends along the plane 19. The plane 19 is arranged perpendicular to each of the first and second confinement surfaces 29, 31.

When the closing mechanism 7 is heated from the first temperature to the second temperature, the closing section 15 transfers from the open configuration into the closed configuration at a predefined temperature. In particular, the closing section 15 of the embodiment shown in FIG. 7 is deformable. Preferably, two end sections 43 of the closing section 15 are deformable in opposite directions as indicated by the arrows in FIG. 7. When the closing mechanism 7 is heated from the first temperature to the second temperature, the closing section 15 deforms such that the closing section 15 transfers from the open configuration into the closed configuration at the predefined temperature.

The closing mechanism 7 may comprise an actuator, which is not shown in FIG. 7. The actuator may act on the closing section 15 such that the two end sections 43 of the closing section 15 are deformed in opposite directions as indicated by the arrows in FIG. 7 such that the closing section 15 transfers from the open configuration into the closed configuration when the closing mechanism 7 is heated from the first temperature to the second temperature.

Therefore, the actuator may be a thermally activated actuator. Alternatively, the closing section 15 can comprise a shape memory polymer, a shape memory alloy or a bimetal such that, when the closing mechanism 7 is heated from the first temperature to the second temperature, the closing section 15 deforms such that the closing section 15 transfers from the open configuration into the closed configuration at the predefined temperature.

When the closing section 15 is in the open configuration as shown in FIG. 7, a section of the cavity 13 forms a channel 21. The channel 21 is arranged between the preform 3 and the closing section 15 and is partially confined by the closing section 15. The channel 21 extends parallel to the plane 19 on the side of the plane 19 facing the closing section 15. In case the preform 3 comprises fiber material for resin infusion, the channel 21 can be used to transfer resin from a resin source via the channel 21 and into the fiber material. Preferably, the two end sections 43 of the closing section 15 are deformable in opposite directions as indicated by the arrows in FIG. 7 such that at least a section of the channel 21 is closable such that the remaining section of the channel 21 is enclosed by the closing section 15 and separated from the remaining section of the cavity 13. Therefore, a gap 45, which enabled the feeding of the resin into the fibers of the preform 3, can be closed. Further, the force required to close the gap 45 can be provided by the actuator.

FIG. 8 schematically illustrates an eighth embodiment of the device 1 for manufacturing a composite component. The device 1 comprises the tool 5 and the closing mechanism 7, wherein the closing mechanism 7 is directly connected to the tool 5. Similar to the previous embodiments, the tool 5 comprises the first section 9 and the second section 11. The first section 9 and the second section 11 are movable relative to each other into and out of a fastening configuration. The fastening configuration is shown in FIG. 8. The first section 9 forms a first confinement surface 29 and the second section 11 forms a second confinement surface 31. When the first section 9 and the second section 11 are arranged in the fastening configuration as shown in FIG. 8, the first confinement surface 29 and the second confinement surface 31 face one another.

Further, when the first section 9 and the second section 11 are arranged in the fastening configuration, the first section 9, the second section 11 and the closing mechanism 7 are arranged such that the cavity 13 is formed between the first section 9, the second section 11 and the closing mechanism 7. The preform 3 is arranged in the cavity 13.

The closing mechanism 7 comprises a closing section 15 and a deformable section, which is not shown in FIG. 8. The deformable section is connected via a connector not shown in FIG. 8 to the tool 5, especially to the first section 9 of the tool 5. The closing section 15 is movable from the open configuration into the closed configuration shown in FIG. 8 and from the closed configuration into the open configuration in the direction of the double arrow in FIG. 8. When the closing section 15 is in the open configuration, the volume of the cavity 13 is larger than the volume of the cavity 13 when the closing section 15 is in the closed configuration. When the closing section 15 is in the open configuration and when the closing section 15 is in the closed configuration, the third confinement surface 25 extends along the plane 19. The plane 19 is arranged perpendicular to each of the first and second confinement surfaces 29, 31.

When the closing mechanism 7 is heated from the first temperature to the second temperature, the closing section 15 transfers from the open configuration into the closed configuration at the predefined temperature. In particular, the deformable section of the embodiment shown in FIG. 8 is deformable. When the closing mechanism 7 is heated from the first temperature to the second temperature, the deformable section deforms such that the closing section 15 is actuated to move from the open configuration into the closed configuration at the predefined temperature. The deformation of the deformable section such that the closing section 15 transfers from the open configuration into the closed configuration is made possible by the embodiment shown in FIG. 8, since the deformable section comprises a material, especially a rubber material, which expands due to a temperature increase such that the closing section 15 is actuated to move, especially to glide parallel to the plane 19, from the open configuration into the closed configuration at the predefined temperature. However, the deformable section may also comprise a shape memory polymer, a shape memory alloy or a bimetal such that, when the closing mechanism 7 is heated from the first temperature to the second temperature, the deformable section deforms such that the closing section 15 is actuated to move from the open configuration into the closed configuration at the predefined temperature.

In the embodiment shown in FIG. 8, the closing section 15 is movable relative to the tool 5, wherein, when the closing mechanism 7 is heated from the first temperature to the second temperature, the closing section 15 moves relative to the tool 5 such that the closing section 15 transfers from the open configuration into the closed configuration at the predefined temperature. In this particular embodiment, the temperature dependent deformation of the deformable section actuates the movement of the closing section 15 relative to the tool 5. However, other actuators than the deformable section can be provided to actuate the movement of the closing section 15 relative to the tool 5 such that the closing section 15 transfers from the open configuration into the closed configuration at the predefined temperature. For example, the closing section 15 may comprise a magnetic material. Due to the magnetic material of the closing section 15, the closing section 15 can be brought from the open configuration into the closed configuration by the further section, which may be the deformable section, of the closing mechanism 7 due to a temperature dependent actuation of the movement of the closing section 15 by the further section of the closing mechanism 7. For the temperature dependent actuation of the movement of the closing section 15, the further section of the closing mechanism 7 may also comprise a magnetic material such that the magnetic material of the further section can act magnetically on the magnetic material of the closing section 15 such that the closing section 15 transfers from the open configuration into the closed configuration.

When the closing section 15 is in the open configuration, i.e. moved to the left compared to the arrangement in FIG. 8, a section of the cavity 13 forms a channel 21 between the preform 3, preferably the first section 9, the second section 11, and the closing mechanism 7. The channel 21 extends parallel to the plane 19 on the side of the plane 19 facing the closing section 15. In case the preform 3 comprises fiber material for resin infusion, the channel 21 can be used to transfer resin from a resin source via the channel 21 and into the fiber material.

Each of the embodiments of the device 1 shown in FIGS. 1A to 8 can be used in a method for manufacturing the composite component. First, the preform 3 is provided. Second, the first section 9 and the second section 11 are actuated to move relative to each other into the fastening configuration. In the fastening configuration, the first confinement surface 29 and the second confinement surface 31 face one another and a section of the preform 3 is arranged in the cavity 13. The closing mechanism 7 is heated from the first temperature to the second temperature such that the closing section 15 transfers from the open configuration into the closed configuration at the predefined temperature such that the third confinement surface 25 of the closing section 15 extends along the plane 19, which is arranged perpendicular to each of the first and second confinement surfaces 29, 31. The preform 3 may comprise pre-preg material and may be clamped between the first and second confinement surfaces 29, 31 such that the preform 3 is compressed between the first and second confinement surfaces 29, 31. Once the closing section 15 is in the closed configuration, the third confinement surface 25 extends along the plane 19. The preform 3 may also comprise fiber material for resin infusion. In this case, the channel 21 can be used to transfer resin from a resin source via the channel 21 and into the fiber material.

It is additionally pointed out that "comprising" does not rule out other elements, and "a" or "an" does not rule out a multiplicity. It is also pointed out that features that have been described with reference to one of the above example embodiments may also be disclosed as in combination with other features of other example embodiments described above. Reference signs in the claims are not to be regarded as restrictive.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for manufacturing a composite component, comprising:
   a tool with a first section forming a first confinement surface and a second section forming a second confinement surface;
   the first section and the second section being movable relative to each other into and out of a fastening configuration;
   a closing mechanism with a closing section forming a third confinement surface;
   the closing mechanism being directly or indirectly connected to the tool;
   wherein, when the first and second sections are in the fastening configuration, the first confinement surface and the second confinement surface face one another, and the first section, the second section and the closing mechanism are arranged such that a cavity is formed between the first section,
   the second section and the closing mechanism,
   wherein the closing section is transferable from an open configuration into a closed configuration, wherein, when the closing section is in the open configuration, a volume of the cavity is larger than a volume of the cavity when the closing section is in the closed configuration, wherein, when the closing section is in the closed configuration, the third confinement surface extends along a plane which is perpendicular to each of the first and second confinement surfaces, and wherein, when the closing mechanism is heated from a first temperature to a second temperature, the closing section transfers from the open configuration into the closed configuration at a predefined temperature.

2. The device according to claim 1, wherein the closing section is deformable, wherein, when the closing mechanism is heated from the first temperature to the second temperature, the closing section deforms such that the closing section transfers from the open configuration into the closed configuration at the predefined temperature.

3. The device according to claim 2, wherein the closing section comprises a shape memory polymer.

4. The device according to claim 2, wherein the closing section comprises a shape memory alloy.

5. The device according to claim 2, wherein the closing section comprises a bimetal.

6. The device according to claim 1, wherein the closing section is movable relative to the tool, wherein, when the closing mechanism is heated from the first temperature to the second temperature, the closing section moves relative to the tool such that the closing section transfers from the open configuration into the closed configuration at the predefined temperature.

7. The device according to claim 1, wherein the closing section comprises a magnetic material.

8. The device according to claim 1, wherein, when the closing section is in the open configuration, a section of the cavity forms a channel, which is partially confined by the third confinement surface and extends parallel to the plane on a side of the plane facing the closing section.

9. The device according to claim 8, wherein the third confinement surface is formed by a mechanically reinforced section of the closing section.

10. A method for manufacturing a composite component using a device, comprising:
providing a device comprising:
a tool with a first section forming a first confinement surface and a second section forming a second confinement surface;
the first section and the second section being movable relative to each other into and out of a fastening configuration;
a closing mechanism with a closing section forming a third confinement surface;
the closing mechanism being directly or indirectly connected to the tool;
wherein, when the first and second sections are in the fastening configuration, the first confinement surface and the second confinement surface face one another, and the first section, the second section and the closing mechanism are arranged such that a cavity is formed between the first section, the second section and the closing mechanism,
wherein the closing section is transferable from an open configuration into a closed configuration, wherein, when the closing section is in the open configuration, a volume of the cavity is larger than a volume of the cavity when the closing section is in the closed configuration,
wherein, when the closing section is in the closed configuration, the third confinement surface extends along a plane which is perpendicular to each of the first and second confinement surfaces, and
wherein, when the closing mechanism is heated from a first temperature to a second temperature, the closing section transfers from the open configuration into the closed configuration at a predefined temperature;
providing a preform;
moving the first section and the second section relative to each other into the fastening configuration such that the first confinement surface and the second confinement surface face one another and at least a section of the preform is arranged in the cavity formed between the first section, the second section and the closing mechanism; and
heating the closing mechanism from the first temperature to the second temperature such that the closing section transfers from the open configuration into the closed configuration at the predefined temperature such that the third confinement surface of the closing section extends along the plane, which is arranged perpendicular to each of the first and second confinement surfaces.

11. The method according to claim 10, wherein the preform comprises pre-preg material.

12. The method according to claim 10, wherein the preform comprises fiber material for resin infusion.

* * * * *